Patented July 20, 1937

2,087,715

UNITED STATES PATENT OFFICE 2,087,715

AROMATIC ACID AMIDES CONTAINING THE TRICHLOROMETHYL GROUP AND A PROCESS OF PREPARING THEM

Arthur Wolfram, Frankfort-on-the-Main, and Emil Hausdörfer, Hofheim-on-the-Taunus, Germany, assignors to General Aniline Works, Inc., New York, N. Y., a corporation of Delaware No Drawing. Application April 22, 1936, Serial No. 75,866. In Germany April 27, 1935

11 Claims. (Cl. 260—124)

The present invention relates to aromatic acid amides containing the trichloro-methyl group and to a process of preparing them.

It is known that aromatic bases of the following formula:

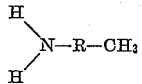

wherein R represents an aromatic radical of the benzene series and one hydrogen atom of the amino-group may be exchanged for an acyl-radical, for instance, a formyl-, acetyl-, benzoyl- or toluene-sulfonyl-radical, by the action of chlorine are chlorinated in the nucleus R and, it may be, at the nitrogen atom.

Now, we have found that, when chlorine is caused to act at elevated temperature, for instance 120° C. to 220° C., upon an aromatic base of the above formula in which both hydrogen atoms of the amino-group are exchanged for an ortho-dicarboxylic acid radical, for instance upon a compound of the general formula:

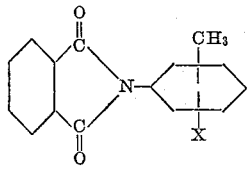

wherein X means methyl, chlorine or hydrogen, chlorine does not enter the nucleus, but is substituted for the three hydrogen atoms of the methyl group.

It is of advantage to expose the mixture undergoing the reaction to light since thereby the absorption of chlorine is accelerated. The aromatic base is used in a liquid form, for instance, the chlorine may be passed into the fused imide or into a solution of the base, for instance, in trichlorobenzene.

There are obtained in a very good yield compounds of the following type:

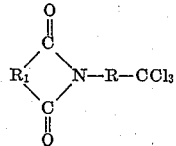

wherein R stands for an aromatic radical of the benzene series and

represents the radical of phthalic acid.

It is surprising that the reaction occurs so smoothly since, for instance, when chlorinating under the same conditions a compound of the general formula $NO_2$—R—$CH_3$ wherein R stands for an aromatic radical of the benzene series, the nitro group is split off in the course of the chlorination process.

The new compounds are useful as intermediates for the manufacture of dyestuffs.

The compounds used as starting materials may be prepared according to the known process of preparing N-phenylphthalimide by heating equimolecular quantities of phthalic acid and an amine (cf. Beilstein, 4th edition, vol. 21, page 464, under "N-phenylphthalimide").

The following examples serve to illustrate the invention but they are not intended to limit it thereto, the parts are by weight:

(1) At a temperature of 190° C. to 210° C. chlorine is introduced in a quick current, while stirring rapidly and exposing to light, into 310 parts of melted ortho-methyl-phenylphthalimide of the formula:

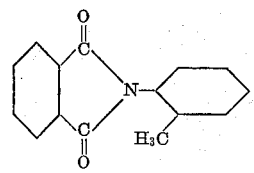

(melting point 181° C. to 182° C.), until an increase of weight of 139 parts is attained. A strong evolution of hydrochloric acid gas sets in.

The increase of weight is attained the sooner the more intense the source of light, for instance, after about 15 hours.

The crude product obtained is distilled under reduced pressure; at 218° C. to 220° C. under a pressure of 2 mm. of mercury the main quantity of a light yellow crystalline product distils which contains 3 chlorine atoms in the molecule. It is the ortho - (omega - trichloro) - methylphenylphthalimide which melts at 153° C. to 158° C. The new product is very sensitive towards water; even when exposed to air it splits off hydrogen chloride.

The yield is good.

(2) Under the same conditions as in Example 1, chlorine is introduced at 190° C. to 210° C. into 310 parts of melted meta-methylphenylphathalimide of the formula:

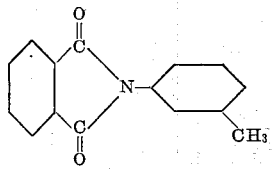

(melting point 173° C. to 177° C.) The necessary increase of weight is attained after about 7 hours.

There is thus obtained crude meta-(omega-trichloro)-methylphenylphthalimide which is light yellow and is much more stable towards the action of water than is the ortho-compound described in Example 1.

(3) Under the same conditions as in Example 1 138 parts of chlorine are introduced at 170° C. to 180° C. into 350 parts of melted 2-methyl-5-chlorophenylphthalimide of the formula

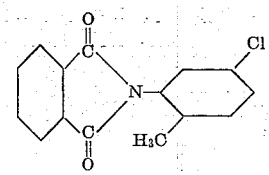

(melting at 168° C. to 173° C.). The increase of weight is attained after about 15 hours.

The crude product is distilled in a vacuum at a pressure of 3 mm. of mercury and distils at 235° C. The 2-(omega-trichloro)-methyl-5-chlorophenylphthalimide so obtained is a beautiful crystalline nearly white mass which is not so sensitive to water as the unsubstituted ortho-compound of Example 1.

This product too is obtained with a good yield.

(4) As described in Example 1, 237 parts of chlorine are introduced at 195° C. to 205° C. into 550 parts of para-methyl-phenylphthalimide of the formula:

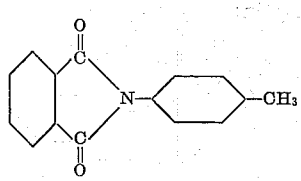

(melting point 203° C. to 204° C.); the operation is finished after about 8 hours.

By distilling the light yellow crystalline crude product in a vacuum, the pure para-(omega-trichloro)-methylphenylphthalimide is obtained which boils at 238° C. to 242° C. under a pressure of 1 mm. of mercury. It is a colorless crystalline body, melting at 205° C. to 210° C., which is very stable towards the action of water. The yield is good.

(5) Under the aforesaid conditions 217 parts of chlorine are introduced at 140° C. to 260° C. into 550 parts of 2-methyl-4-chloro-phenylphthalimide of the formula:

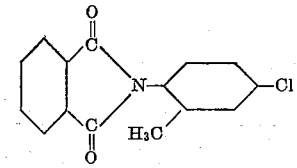

(melting at 137° C. to 139° C.); the operation is finished after about 20 hours. The crude product is distilled in a vacuum. The 2-(omega-trichloro)-methyl-4-chlorphenylphthalimide thus obtained with a good yield boils at 230° C. to 234° C. under a pressure of 0.5 mm. of mercury.

(6) At a temperature of 180° C. to 210° C. 138 parts of chlorine are introduced under the conditions described into 350 parts of 2-methyl-6-chlorphenylphthalimide of the formula:

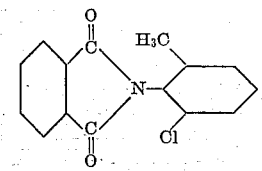

(melting at 134° C. to 136° C.). The desired increase of weight is attained after about 8 hours. By subsequent distillation in a vacuum the 2-(omega-trichlormethyl)-6-chlorphenylphthalimide, boiling at 230° C. to 235° C. under a pressure of 1.5 mm. of mercury, is thus obtained with a good yield.

(7) In the manner above described 138 parts of chlorine are introduced in the course of about 12 hours at 180° C. to 190° C. into 350 parts of 3-chloro-4-methylphenylphthalimide of the formula:

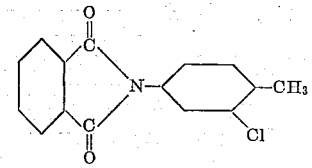

(melting at 160° C. to 162° C.). The 3-chloro-4-(omega-trichloro)-methylphenylphthalimide is thus obtained boiling under a pressure of 1.5 mm. of mercury at 255° C. to 258° C. and melting at 164° C. to 166° C. The yield is good.

(8) Under the conditions stated in the foregoing examples 122 parts of chlorine are introduced in the course of about 10–12 hours at 180° C. to 190° C. into 350 parts of melted 4-methyl-2,5-dichlorophenylphthalimide of the formula:

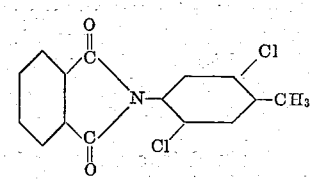

(melting at 173° C. to 175° C.). The crude product is distilled under reduced pressure. The pure 4-(omega-trichloro)-methyl-2,5-dichlorophenylphthalimide is obtained with a good yield, boiling under a pressure of 1 mm. of mercury at 240° C. to 245° C. It melts at 209° C. to 211° C.

(9) Under the conditions above described 169 parts of chlorine are introduced at 170° C. to 190° C. into a solution of 200 parts of 2,6-dimethyl-phenylphthalimide of the formula

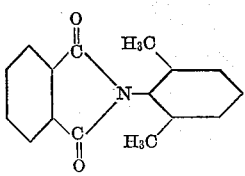

(melting at 199° C. to 203° C.) in 300 parts of trichlorobenzene. The desired increase of weight is attained after about 25 hours. The trichlorobenzene is then distilled for the greater part, the crystalline magma is washed with chlorobenzene and hexahydrobenzene and is then dried. The 2,6 - di-(omega-trichloro) - methylphenylphthalimide is thus obtained with a good yield in the form of white crystalline small needles melting at 235° C. to 237° C.

(10) At 130° C. to 150° C. 297 parts of chlorine are introduced under the above-said conditions into 350 parts of 2,4-dimethyl-phenylphthalimide of the formula:

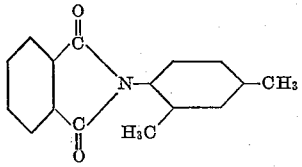

(melting at 158° C. to 162° C.). The desired increase of weight is attained after about 20 hours.

The crude product is distilled under reduced pressure; the 2,4-di-(omega-trichloro)-methylphenylphthalimide is thus obtained with a good yield. It boils at 254° C. to 255° C. under a pressure of 0.4 mm. of mercury.

(11) 350 parts of 2-methyl-3-chlorphenyl-phthalimide of the formula:

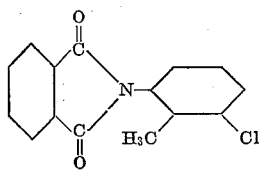

(melting at 220° C.) are dissolved in 350 parts of trichlorobenzene. Under the conditions stated in Example 1, 138 parts of chlorine are introduced in the course of about 25 hours at 170° C. to 180° C.

The trichlorobenzene is distilled off under reduced pressure and the pure 2-(omega-trichloro)-methyl-3-chlorphenylphthalimide then distils with a good yield under a pressure of 1 mm. of mercury at 215° C. to 225° C. The product melts at 175° C. to 177° C.

We claim:

1. The process which comprises causing chlorine to act at a temperature of about 120° C. to about 220° C. upon a compound of the general formula:

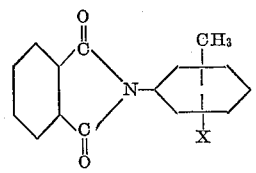

wherein X means a member of the group consisting of methyl, chlorine and hydrogen, which is present in a liquid form.

2. The process which comprises causing chlorine to act at a temperature of about 120° C. to about 220° C. upon a compound of the general formula:

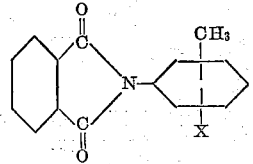

wherein X means a member of the group consisting of methyl, chlorine and hydrogen, which is present in a liquid form, while exposing the reaction mass to active light.

3. The process which comprises causing chlorine to act at a temperature of about 120° C. to about 220° C. upon a compound of the general formula:

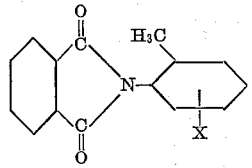

wherein X means a member of the group consisting of methyl, chlorine and hydrogen, which is present in a liquid form.

4. The process which comprises causing chlorine to act at a temperature of about 120° C. to about 220° C. upon a compound of the general formula:

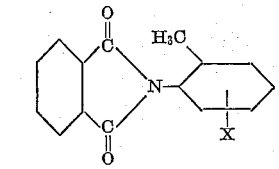

wherein X means a member of the group consisting of methyl, chlorine and hydrogen, which is present in a liquid form, while exposing the reaction mass to active light.

5. The process which comprises causing chlorine to act at a temperature of about 170° C. to about 180° C. upon melted 2-methyl-5-chlorophenylphthalimide while stirring and exposing the reaction mass to active light until three atoms of chlorine have entered the molecule.

6. The process which comprises causing chlorine to act at a temperature of about 130° C. to about 150° C. upon melted 2,4-dimethylphenylphthalimide while stirring and exposing the reaction mass to active light until six atoms of chlorine have entered the molecule.

7. The process which comprises causing chlorine to act at a temperature of about 170° C. to about 180° C. upon a solution of 2-methyl-3-chlorophenylphthalimide while stirring and exposing the reaction mass to active light until three atoms of chlorine have entered the molecule.

8. The compounds of the general formula:

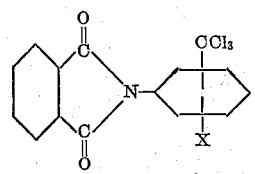

wherein X means a member of the group consisting of hydrogen, chlorine and the group —CCl₃.

9. The compound of the formula:
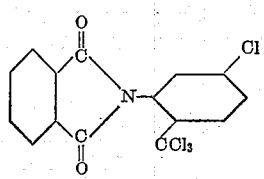
being a beautiful crystalline nearly white mass which is not sensitive to water.
10. The compound of the formula:
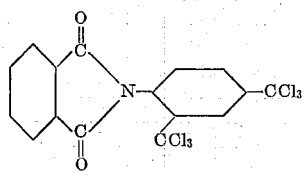
boiling at 254° C. to 255° C. under a pressure of 0.4 mm. of mercury.
11. The compound of the formula:
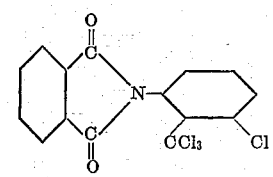
boiling under a pressure of 1 mm. of mercury at 215° C. to 225° C. and melting at 175° C. to 177° C.
ARTHUR WOLFRAM.
EMIL HAUSDÖRFER.